United States Patent
Bohling et al.

(10) Patent No.: US 9,469,760 B2
(45) Date of Patent: Oct. 18, 2016

(54) SULFUR ACID FUNCTIONALIZED LATEX POLYMER

(71) Applicant: Rohm and Haas Company, Philadelphia, PA (US)

(72) Inventors: James C. Bohling, Lansdale, PA (US); Arnold S. Brownell, Lansdale, PA (US); Catherine A. Finegan, Warrington, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 15/019,262

(22) Filed: Feb. 9, 2016

(65) Prior Publication Data

US 2016/0152816 A1 Jun. 2, 2016

Related U.S. Application Data

(62) Division of application No. 14/365,673, filed as application No. PCT/US2012/070013 on Dec. 17, 2012, now Pat. No. 9,303,160.

(60) Provisional application No. 61/577,290, filed on Dec. 19, 2011.

(51) Int. Cl.

| | | |
|---|---|---|
| *C08L 33/08* | (2006.01) | |
| *C08L 43/02* | (2006.01) | |
| *C08F 220/18* | (2006.01) | |
| *C08F 265/04* | (2006.01) | |
| *C08K 3/22* | (2006.01) | |
| *C09D 143/02* | (2006.01) | |
| *C08F 228/00* | (2006.01) | |
| *C08F 230/02* | (2006.01) | |
| *C08K 5/42* | (2006.01) | |
| *C08K 5/521* | (2006.01) | |
| *C08F 275/00* | (2006.01) | |

(52) U.S. Cl.
CPC .............. *C08L 43/02* (2013.01); *C08F 220/18* (2013.01); *C08F 265/04* (2013.01); *C08K 3/22* (2013.01); *C08L 33/08* (2013.01); *C09D 143/02* (2013.01); *C08F 228/00* (2013.01); *C08F 230/02* (2013.01); *C08F 275/00* (2013.01); *C08K 5/42* (2013.01); *C08K 5/521* (2013.01); *C08K 2003/2241* (2013.01); *C08L 2201/54* (2013.01)

(58) Field of Classification Search
CPC ....... C08F 230/02; C08K 5/42; C08K 5/521; C08L 43/02; C09D 143/02
USPC ....................................................... 524/547
See application file for complete search history.

(56) References Cited

U.S. PATENT DOCUMENTS

| | | | | |
|---|---|---|---|---|
| 4,051,093 A * | 9/1977 | Wendel | ................ | C08F 212/08 427/389.9 |
| 6,080,802 A | 6/2000 | Emmons et al. | | |
| 6,485,786 B2 * | 11/2002 | Deng | ................ | C09D 133/062 427/385.5 |
| 6,846,867 B2 * | 1/2005 | Gebhard | ............... | C04B 41/483 524/375 |
| 7,179,531 B2 * | 2/2007 | Brown | ................... | C08F 2/001 428/407 |
| 7,488,534 B2 * | 2/2009 | Koller | ....................... | C08F 2/44 428/403 |
| 8,907,004 B2 * | 12/2014 | Henderson | ........... | C09D 141/00 524/284 |
| 2003/0018103 A1 | 1/2003 | Bardman et al. | | |
| 2006/0223935 A1 * | 10/2006 | Fasano | ................. | C08F 220/18 524/501 |
| 2007/0208129 A1 * | 9/2007 | Finegan | ................ | C08F 220/18 524/497 |
| 2008/0146724 A1 * | 6/2008 | Bohling | .................... | C08F 2/22 524/500 |
| 2009/0171005 A1 * | 7/2009 | Finegan | ................ | C08F 220/18 524/521 |
| 2010/0034975 A1 * | 2/2010 | Bohling | ................ | C08F 220/18 427/385.5 |
| 2010/0112344 A1 * | 5/2010 | Baker | .................. | C09D 143/02 428/341 |
| 2012/0058277 A1 * | 3/2012 | Bohling | ................. | C08F 2/001 427/385.5 |
| 2012/0277334 A1 * | 11/2012 | Zhang | .................... | C09D 5/002 521/28 |
| 2014/0011943 A1 * | 1/2014 | Bardman | .............. | C09C 1/3676 524/521 |
| 2014/0080988 A1 * | 3/2014 | Wang | ..................... | C08F 220/58 526/266 |
| 2014/0187706 A1 * | 7/2014 | Bohling | ................. | C09D 5/028 524/521 |
| 2014/0329957 A1 * | 11/2014 | Bohling | ................ | C08F 220/18 524/547 |
| 2015/0005446 A1 * | 1/2015 | Bohling | ................. | C08F 2/001 524/807 |
| 2015/0361291 A1 * | 12/2015 | Brownell | .............. | C08F 220/18 524/561 |

FOREIGN PATENT DOCUMENTS

EP 0643081 A1 3/1995

* cited by examiner

*Primary Examiner* — Michael A Salvitti
(74) *Attorney, Agent, or Firm* — Reid S. Willis

(57) ABSTRACT

The present invention is a process for preparing a multistage polymer by contacting under emulsion polymerization conditions an acrylic monomer, a sulfur acid monomer, and a phosphorous acid monomer as described herein. The multistage polymer is useful as a binder for coatings compositions.

10 Claims, No Drawings

SULFUR ACID FUNCTIONALIZED LATEX POLYMER

BACKGROUND OF THE INVENTION

The present invention relates to a stable aqueous dispersion of polymer particles containing sulfur acid functionality (a sulfur acid functionalized latex polymer). This dispersion is useful in coatings formulations.

Titanium dioxide ($TiO_2$) is an expensive component of many coatings or paints. The efficacy of $TiO_2$ as a hiding pigment is reduced when $TiO_2$ particles are allowed to come too close together upon film formation and drying (which they tend to do). It has been disclosed that the spacing of $TiO_2$ and its resultant efficiency can be improved using an adsorbing emulsion polymer.

U.S. Pat. No. 7,179,531 discloses polymer particles having select functional or absorbing groups useful for preparing organic-inorganic composite particles that are suitable for providing dried coatings with improved hiding. These organic-inorganic composite particles must remain stable in the coating or paint for long periods of time and withstand shear that is normally applied to coatings. This additional shear on finished coatings is often applied during the color tinting process or as mixing before paint is used. Although the polymer particles with absorbing groups may be stable when stored alone, the composite may be less stable. This instability can be further exacerbated by storing the paint at high temperatures in order to mimic long term shelf stability. Accordingly, it would be desirable to find improve the shelf stability of coating formulations that contain organic-inorganic composite particles.

SUMMARY OF THE INVENTION

The present invention provides, in a first aspect, a process comprising: a) contacting together a first sulfur acid monomer, a phosphorous acid monomer, and a first acrylic monomer, under emulsion polymerization conditions to form a stable aqueous dispersion of first polymer particles, then; b) contacting the dispersion of the first polymer particles with a second sulfur acid monomer; and a second acrylic monomer under emulsion polymerization conditions to form a stable aqueous dispersion of multistage polymer particles; wherein the weight percents of the first and second sulfur acid monomers are from 0.5 to 1.0 weight percent, based on the weight of the multistage polymer particles; the weight percent of the phosphorous acid monomer is from 0.4 to 2 weight percent, based on the weight of the multistage polymer particles; and the combined weight percents of the first and second acrylic monomers are from 30 to 99 weight percent, based on the weight of the multistage polymer particles; wherein the mole-mole ratio of the first sulfur acid monomer to the second sulfur acid monomer is from 0.5:1 to 3:1, and the multistage polymer has a $T_g$ of less than 10° C.

In a second aspect, the present invention provides a composition comprising a nonionic surfactant and a stable aqueous dispersion of polymer particles comprising, based on the weight of the polymer particles: a) from 30 to 99 weight percent structural units of acrylic monomers; b) from 0.5 to 1.0 weight percent structural units of a sodium vinylbenzenesulfonate; and c) from 0.4 to 2 weight percent structural units of phosphoethyl methacrylate; wherein the acrylic monomers comprise methyl methacrylate and one or more monomers selected from the group consisting of butyl acrylate, ethylhexyl acrylate, 2-propylheptyl acrylate, ethyl acrylate, and ureido methacrylate; and wherein the polymer particles have a $T_g$ of less than 10° C.

The composition of the present invention is useful as a binder for coatings formulations that exhibit excellent shelf stability and hiding properties.

DETAILED DESCRIPTION OF THE INVENTION

In a first aspect, the present invention is a process comprising: a) contacting together a first sulfur acid monomer, a phosphorous acid monomer, and a first acrylic monomer, under emulsion polymerization conditions to form a stable aqueous dispersion of first polymer particles, then; b) contacting the dispersion of the first polymer particles with a second sulfur acid monomer; and a second acrylic monomer under emulsion polymerization conditions to form a stable aqueous dispersion of multistage polymer particles; wherein the weight percents of the first and second sulfur acid monomers are from 0.5 to 1.0 weight percent, based on the weight of the multistage polymer particles; the weight percent of the phosphorous acid monomer is from 0.4 to 2 weight percent, based on the weight of the multistage polymer particles; and the combined weight percents of the first and second acrylic monomers are from 30 to 99 weight percent, based on the weight of the multistage polymer particles; wherein the mole-mole ratio of the first sulfur acid monomer to the second sulfur acid monomer is from 0.5:1 to 3:1, and the multistage polymer has a $T_g$ of less than 10° C.

The process of the present invention is a multistage process, preferably a two-stage process, wherein a first sulfur acid monomer, a phosphorous acid monomer, and a first acrylic monomer are contacted together under emulsion polymerization conditions to form a stable aqueous dispersion of first polymer particles.

As used herein, the term "sulfur acid monomer" refers to one or more ethylenically unsaturated compounds that have sulfur acid or sulfur acid salt functionality. Examples of suitable sulfur acid monomers include sulfoethyl methacrylate, sulfoethyl acrylate sulfopropyl methacrylate, sulfopropyl acrylate, vinylbenzenesulfonic acid, and vinylsulfonic acid, and salts thereof. A preferred sulfur acid monomer is a sodium vinylbenzenesulfonate, more particularly 4-vinylbenzenesulfonate. Preferably, the concentration of first sulfur acid monomer is from 1.1 to 1.6 weight percent based on the weight of the first polymer particles.

As used herein, the term "phosphorous acid monomer" refers to one or more phosphonates and/or dihydrogen phosphate esters of an alcohol, or phosphonates and/or dihydrogen phosphate amides of an amine, or salts thereof, in which the alcohol or amine contains or is substituted with a polymerizable vinyl or olefinic group. Preferred phosphorous acid monomers are dihydrogen phosphate esters; preferred dihydrogen phosphate esters are phosphates of hydroxyalkyl acrylates and methacrylates, including phosphoethyl methacrylate and phosphopropyl methacrylates and salts thereof, with phosphoethyl methacrylate being especially preferred. "Phosphoethyl methacrylate" (PEM) is used herein to refer to the following structure:

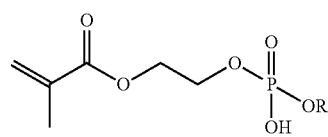

or a salt thereof, or a combination thereof, where R is H or:

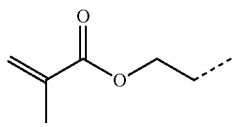

Preferably, the amount of phosphorous acid monomer or salt thereof or a combination thereof is from 0.7 to 1.5 weight percent, based on the weight of the multistage polymer particles.

The term "acrylic monomer" is used herein to refer to one or more acrylates and/or methacrylates such as methyl methacrylate, ethyl methacrylate, ethyl acrylate, butyl acrylate, butyl methacrylate, and ethyl hexyl acrylate and combinations thereof. Preferred combinations of acrylic monomers include methyl methacrylate and one or more monomers selected from the group consisting of ethyl acrylate, butyl acrylate, ureido methacrylate, 2-propylheptyl acrylate, and 2-ethylhexyl acrylate. More preferred combinations of acrylic monomers include methyl methacrylate and butyl acrylate; methyl methacrylate and ethylhexyl acrylate; and methyl methacrylate, butyl acrylate, and ethyl acrylate, with the combination of methyl methacrylate and butyl acrylate being most preferred.

In a second stage, the dispersion of first polymer particles is contacted with a second sulfur acid monomer a second acrylic monomer under emulsion polymerization conditions to form a stable aqueous dispersion of multistage polymer particles. The sulfur acid monomer may be the same as or different from the first sulfur acid monomer and is preferably sodium 4-vinylbenzene sulfonate. The weight percents of the first and second sulfur acid monomers are preferably from 0.5 to 0.8 weight percent, based on the weight of the multistage polymer particles; the mole-mole ratio of the first sulfur acid monomer to the second sulfur acid monomer is preferably from 1.5:1 to 3.0:1, and more preferably from 1.75:1 to 2.25:1. By way of example, a 6.0-g addition of sodium 4-vinylbenzene sulfonate in the first step followed by a 3.0-g addition of sodium 4-vinylbenzene sulfonate in the second step represents a 2:1 mole-mole ratio of the first sulfur acid monomer to the second sulfur acid monomer.

Similarly, the second acrylic monomer may be the same as or different from the first acrylic monomer. Preferably, the second acrylic monomer comprises predominantly methyl methacrylate and butyl acrylate and a minor amount of ureido methacrylate (typically from 0.1 to 2 weight percent, based on the total monomers in the second stage). Preferably, the multistage polymer particles comprise from 53 to 63 weight percent butyl acrylate and from 35 to 45 weight percent methyl methacrylate, based on the weight of the multistage polymer particles.

The process of the present invention may include copolymerization of other monomers such as styrene, vinyl esters including vinyl acetate, and ethylene in either or both stages of the process.

The monomers in steps a) and b) are contacted under emulsion polymerization conditions such as those well known in the art. Initiators such as sodium persulfate and a catalyst/activator pair such as t-butyl hydroperoxide or hydrogen peroxide and isoascorbic acid. The polymerization reactions are advantageously carried out in the presence of a suitable surfactant, preferably an anionic surfactant such as an alkali metal alkyl ether sulfate; examples of such surfactants include sodium laureth-4-sulfate (commercially available as Disponil FES 32 surfactant) and sodium laureth-12-sulfate commercially available as Disponil FES 993 surfactant).

Following the preparation of the dispersion of the multistage polymer, a nonionic or anionic surfactant is advantageously contacted with the dispersion at a concentration preferably in the range of 0.1 to 5 weight percent, based on the weight of the dispersion of the multistage polymer. Addition of a nonionic surfactant such as a secondary alcohol ethoxylate or an alkyl phenol alkoxylate is preferred. An example of commercially available secondary alcohol ethoxylates are TERGITOL™ 15-S Series Surfactants, (A Trademark of The Dow Chemical Company or its Affiliates), illustrated below:

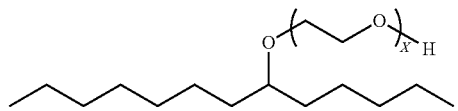

where x is from 8 to 40.

Examples of alkyl phenol alkoxylates include nonyl phenol ethoxylate and octyl phenol ethoxylate, which is commercially available as TRITON™ X-100 surfactant (A Trademark of The Dow Chemical Company or its Affiliates):

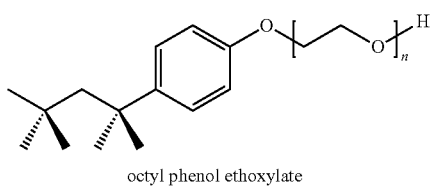

octyl phenol ethoxylate where n is about 9 to 11.

In a second aspect, the present invention is a composition comprising a nonionic surfactant and a stable aqueous dispersion of polymer particles comprising, based on the weight of the polymer particles: a) from 30 to 99 weight percent structural units of acrylic monomers; b) from 0.5 to 1.0 weight percent structural units of a sodium vinylbenzenesulfonate; and c) from 0.4 to 2 weight percent structural units of phosphoethyl methacrylate; wherein the acrylic monomers comprise methyl methacrylate and one or more monomers selected from the group consisting of butyl acrylate, ethylhexyl acrylate, 2-propylheptyl acrylate, ethyl acrylate, and ureido methacrylate; and wherein the polymer particles have a $T_g$ of less than 10° C.

Preferably, the nonionic surfactant is a secondary alcohol ethoxylate or an alkyl phenol alkoxylate at a concentration of from 0.1 to 5% by weight, based on the weight of the composition; the polymer particles preferably comprise sodium 4-vinylbenzenesulfonate at a concentration of from 0.5 to 0.8 weight percent, and phosphoethyl methacrylate at a concentration of from 0.7 to 1.5 weight percent, based on the weight of the polymer particles; moreover, the structural units of acrylic monomers preferably comprise 53 to 63 weight percent butyl acrylate and 35 to 45 weight percent methyl methacrylate, based on the weight of the polymer.

The term "structural units" is used to refer to the groups formed from the polymerization of the corresponding monomer. A structural unit of methyl methacrylate is illustrated:

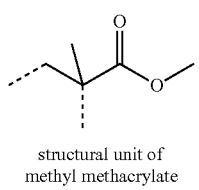

structural unit of
methyl methacrylate where the dotted lines indicate the points of connectivity to the polymer backbone.

The composition of the present invention can be combined with pigments such as $TiO_2$ particles to form a composite with the polymer particles contacting the surface of the $TiO_2$ particles. The composite is useful in coatings compositions, which can be prepared by combining the composite with, for example, one or more thickeners; dispersants; surfactants; coalescing agents; defoamers; adhesion promoters; tackifying agents; waxes; preservatives; flow agents; leveling agents; and/or neutralizing agents. The coatings composition preferably contains a substantial absence of ancillary VOCs, that is, VOCs other than residual monomer or byproduct of monomer used to make the multistage polymer particles. A substantial absence of ancillary VOCs refers to less than 50 g, preferably less than 10 g, and most preferably less than 5 g, of ancillary volatile organic compounds per liter of coating composition.

EXAMPLES

The following examples are for illustrative purposes only and are not intended to limit the scope of the invention.

Example 1

Synthesis of a 2-Stage Acrylate Polymer: Sodium 4-Vinylbenzenesulfonate Added in Both Stages A first monomer emulsion was prepared by mixing deionized water (200 g), anionic surfactant Disponil FES-993 surfactant (28.25 g, 30% active), butyl acrylate (285.6 g), methyl methacrylate (192.12 g), phosphoethyl methacrylate (25.5 g, 60% active), and sodium 4-vinylbenzenesulfonate (7.53 g, 90% active). A second monomer emulsion was prepared by mixing deionized water (420 g), Disponil FES-993 surfactant (28.75 g, 30% active), butyl acrylate (666.4 g), methyl methacrylate (511.75 g), sodium 4-vinylbenzenesulfonate, (3.78 g, 90% active) and ureido methacrylate (17 g, 50% active).

Deionized water (900 g) and Disponil FES-993 surfactant (17 g, 30% active) were added to a 5-liter, four-necked round bottom flask equipped with a paddle stirrer, a thermometer, a nitrogen inlet, and a reflux condenser. The contents of the flask were heated to 84° C. under nitrogen and stirring was initiated. A portion of the first monomer emulsion (110 g) was then added quickly, followed by addition of a solution of ammonium persulfate (6.7 g) in deionized water (20 g), and a rinse of deionized water (5 g). After stirring for 10 min, the remainder of the first monomer emulsion, a rinse (25 g), and an initiator solution of ammonium persulfate (0.40 g) in deionized water (30 g) were added linearly and separately over 30 min. The contents of the flask were held at 84° C. for 10 min, after which time the second monomer emulsion and an initiator solution containing sodium persulfate (1.1 g) in deionized water (80 g) were added linearly and separately to the flask over a period of 80 min Twenty min into the feeds, a solution of ammonium hydroxide (16 g, 29% active) in deionized water (20 g) was added linearly and separately over the remaining 60 min of the feeds. The contents of the flask were maintained at a temperature of 83-84° C. during the addition of the second monomer emulsion. When all additions were complete, the container containing the second monomer emulsion was rinsed with deionized water (25 g), which was then added to the flask.

The contents of the flask were cooled to 65° C. and a catalyst/activator pair was added to the flask to reduce residual monomer. TERGITOL™ 15-S-40 Non-ionic Surfactant (A Trademark of The Dow Chemical Company or its Affiliates, 24.25 g, 70% solids) was added and the dispersion neutralized to pH 8.7 with a dilute KOH solution. The particle size was measured to be 95-105 nm and the percent solids was found to be 46-47%.

Comparative Example 1

Preparation of a 2-Stage Polymer: Sodium 4-Vinylbenzenesulfonate Added in $1^{st}$ Stage Only The polymer dispersion was prepared substantially as described in Example 1 except that sodium 4-vinylbenzenesulfonate (7.53 g, 90% active) was added in the first stage and no sodium 4-vinylbenzenesulfonate was added in the second stage. Also, no surfactant was post-added to the dispersion. The dispersion was found to have a Brookfield viscosity of <400 cps.

Comparative Example 2

Preparation of a 2-Stage Polymer: Sodium 4-Vinylbenzenesulfonate Added in $1^{st}$ Stage Only The polymer was prepared substantially as described in Example 1 except that sodium 4-vinylbenzenesulfonate (11.31 g, 90% active) was added in the first stage and none in the second stage. The dispersion gelled and could not be evaluated in stability studies.

Examples 2-5

Preparation of a 2-Stage Polymer: Sodium 4-Vinylbenzenesulfonate Added in Both Stages The dispersions were prepared substantially as described in Example 1 except for the nature of the post-added surfactant. Table 1 illustrates the effect of staging of sodium 4-vinylbenzenesulfonate and post-added surfactant to stability of the dispersions in a heat age study. The surfactants, if used, were post-added at 1% based on polymer solids content. $\eta_0$ is the initial Stormer viscosity in Krebs units; $\eta_1$ is the viscosity after 3 weeks at 60° C.; $\eta_2$ is the viscosity after 3 weeks at 60° C. with 5 min shear.

TABLE 1

Heat Age Study of Dispersions

| Example # | Post-Added Surfactant | $\eta_o$(KU) | $\eta_1$(KU) | $\eta_2$(KU) |
|---|---|---|---|---|
| Comp. Ex. 1 | None | 99 | >140* | gel |
| Ex. 1 | 1% Tergitol 15-S-40 nonionic | 100 | 118 | 121 |
| Ex. 2 | None | 103 | 129 | >140* |
| Ex. 3 | 1% Triton X-100 nonionic | 101 | 118 | 118 |

TABLE 1-continued

Heat Age Study of Dispersions

| Example # | Post-Added Surfactant | $\eta_o$(KU) | $\eta_1$(KU) | $\eta_2$(KU) |
|---|---|---|---|---|
| Ex. 4 | 1% Disponil FES-32 anionic sulfate | 103 | 117 | 118 |
| Ex. 5 | 1% Rhodafac RS-610 anionic phosphate | 103 | 123 | 134 |

*Exceeds the viscosity limits of the instrument

The results show that in the absence of partitioning sodium 4-vinylbenzenesulfonate into both stages of polymerization reaction, the either dispersion gels immediately (Comparative Example 2) or gels within 3 weeks in the stability studies (Comparative Example 1). In contrast, the examples of the present invention, all of which were prepared by adding sodium 4-vinylbenzenesulfonate in both stages, show stability after 3 weeks. Where a nonionic or anionic surfactant was post-added (Example 1, 3, 4, and 5), stability is further enhanced, as evidenced by the measurable Stormer viscosity observed after additional shear.

While not bound by theory, it is believed that the partitioning of sulfur acid monomer, preferably sodium 4-vinylbenzene sulfonate, into both stages of the reaction, while staging the phosphorous acid monomer in the first stage only, produces polymer particles with a more homogeneous distribution of relatively non-adsorbing groups (i.e., the sulfur acid groups) and a more heterogeneous distribution of relatively adsorbing groups (i.e., the phosphorous acid groups). The more homogeneous distribution of non-adsorbing groups is believed to impart improved stability to the polymer particles, while the more heterogeneous distribution of the adsorbing groups gives better adsorptivity.

The invention claimed is:

1. A process comprising:
   a) contacting together sodium 4-vinylbenzene sulfonate, a phosphorous acid monomer, and a first acrylic monomer, under emulsion polymerization conditions to form a stable aqueous dispersion of first polymer particles, then;
   b) contacting the dispersion of the first polymer particles with sodium 4-vinylbenzene sulfonate; and a second acrylic monomer under emulsion polymerization conditions to form a stable aqueous dispersion of multistage polymer particles;
   wherein the weight percents of the first and second sulfur acid monomers are from 0.5 to 1.0 weight percent, based on the weight of the multistage polymer particles; the weight percent of the phosphorous acid monomer is from 0.4 to 2 weight percent, based on the weight of the multistage polymer particles; and the combined weight percents of the first and second acrylic monomers are from 30 to 99 weight percent, based on the weight of the multistage polymer particles; wherein the mole-mole ratio of the first sulfur acid monomer to the second sulfur acid monomer is from 0.5:1 to 3:1, and the multistage polymer has a $T_g$ of less than 10° C.

2. The process of claim 1 wherein the phosphorous acid monomer is phosphoethyl methacrylate; and the first and second acrylic monomers comprise methyl methacrylate and one or more monomers selected from the group consisting of butyl acrylate, 2-ethylhexyl acrylate, 2-propylheptyl acrylate, ethyl acrylate, and ureido methacrylate.

3. The process of claim 2 wherein the first and second acrylic monomers comprise methyl methacrylate and butyl acrylate.

4. The process of claim 2 wherein the first and second acrylic monomers comprise methyl methacrylate and 2-ethylhexyl acrylate.

5. The process of claim 2 wherein the first and second monomers comprise methyl methacrylate, butyl acrylate, and ethyl acrylate.

6. The process of claim 2 wherein the mol:mol ratio of the first sulfur acid monomer to the second sulfur acid monomer is from 1.75:1 to 2.25:1; wherein the first and second acrylic monomers together comprise 53 to 63 weight percent butyl acrylate and 35 to 45 weight percent methyl methacrylate, based on the weight of the multistage polymer particles; and wherein after step b), from 0.1 to 5 weight percent of a nonionic or anionic surfactant, based on the weight of the multistage polymer particles, is contacted with the dispersion of multistage polymer particles.

7. The process of claim 6 wherein the surfactant is a nonionic surfactant.

8. The process of claim 7 wherein the nonionic surfactant is a secondary alcohol ethoxylate or an alkyl phenol alkoxylate.

9. The process of claim 8 wherein the surfactant is a secondary alcohol ethoxylate represented by the following structure:

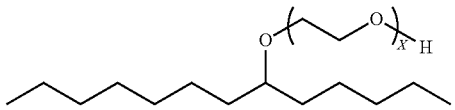

where x is from 8 to 40.

10. The process of claim 8 wherein the surfactant is an alkyl phenol ethoxylate represented by the following structure:

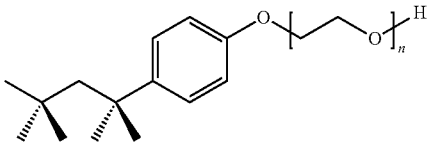

where n is about 9 to 11.

* * * * *